United States Patent
Meins

(10) Patent No.: US 6,612,164 B1
(45) Date of Patent: Sep. 2, 2003

(54) MEASURING DEVICE AND SENSOR FOR CONTACTLESSLY MEASURING TIRE FORCES

(75) Inventor: Jon Meins, Dreieich (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 0 days.

(21) Appl. No.: 10/049,077

(22) PCT Filed: Jul. 12, 2000

(86) PCT No.: PCT/EP00/06642

§ 371 (c)(1), (2), (4) Date: Feb. 6, 2002

(87) PCT Pub. No.: WO01/11330

PCT Pub. Date: Feb. 15, 2001

(30) Foreign Application Priority Data

Aug. 6, 1999 (DE) .......................................... 199 37 078

(51) Int. Cl.[7] .......................... B60C 23/02; E01C 23/00; G01M 9/00
(52) U.S. Cl. ......................................... 73/146.5; 73/146
(58) Field of Search ................................ 73/146–146.8, 73/862; 340/442, 443, 438; 378/61; 356/139

(56) References Cited

U.S. PATENT DOCUMENTS 6,069,966 A * 5/2000 Jones et al. ................. 382/100

2002/0104717 A1 * 8/2002 Borugian .................... 188/1.11

FOREIGN PATENT DOCUMENTS

| DE | 42 42 726 | 6/1994 |
|----|-----------|--------|
| DE | 195 48 759 | 6/1997 |
| DE | 196 26 843 | 1/1998 |
| DE | 197 25 775 | 2/1999 |
| FR | 2710144 | 3/1995 |

OTHER PUBLICATIONS

Search Report of the German Patent Office for Appln. 19937078.8.

* cited by examiner

*Primary Examiner*—Hezron Williams
*Assistant Examiner*—Marissa Ferguson
(74) *Attorney, Agent, or Firm*—Rader, Fishman & Grauer PLLC

(57) ABSTRACT

The present invention relates to a sensor as well as a measuring device with a sensor of this type for contactlessly detecting the change in position of a measuring point on or in a tire on the basis of a force acting on the tire of a wheel, in particular during driving, wherein the sensor is fixed in a stationary position in relation to the rim of the wheel. So as to be able to measure, in a simple manner, the transversal and longitudinal forces acting on the tire during driving, the sensor detects the change in position of the measuring point in the longitudinal or transverse direction (y,x) in relation to the running surface of the tire.

12 Claims, 1 Drawing Sheet

MEASURING DEVICE AND SENSOR FOR CONTACTLESSLY MEASURING TIRE FORCES

TECHNICAL FIELD

The present invention generally relates to sensors, and more particularly relates to sensor for contactlessly measuring forces which act on the tire of a wheel, especially during driving.

BACKGROUND OF THE INVENTION

In view of the increasingly dense traffic and larger engines of motor vehicles, controlled intervention in the brake—and engine—system based on measured data of vehicle dynamics has attained greater significance, since errors in the driver's, driving behavior can be compensated to a certain extent in this way. The forces acting on the vehicle and, in particular, on the tires play a special part in these types of control operations. Whereas it is possible, as such, to obtain the driving dynamics data of a vehicle through the rotary behavior of the wheels of a vehicle, more recent developments strive to measure the forces acting on the tires of the vehicle in order to obtain an input value that is even more suitable for motor vehicle control systems.

Thus, for example, DE-PS 39 37 966 discloses the possibility of measuring the forces acting on a tire on all three coordinates by means of sensors positioned in the tire. This known principle is complicated and prone to failure. Another disadvantage of the prior-art solution is that it is difficult to mount the tires, since the sensor signals from the tire have to be transmitted to an amplifier on the rim and then from the amplifier to a sensor arranged on the rim, from where they are then contactlessly transmitted to the vehicle body. The above-mentioned document makes no statement concerning the type of transmission between the sensors and the amplifier within the tire. If such a transmission inside the tire is handled by means of lines, then mounting the tires becomes difficult because the connecting lines between the sensor and the amplifier inside the tire must not be damaged during the mounting process.

On the other hand, DE-OS 19744611 discloses that the distance of a measuring point on the inner surface of a tire can be measured by a sensor arranged on the rim without contacts in order to determine the air pressure in the tire.

BRIEF SUMMARY OF THE INVENTION

An object of the present invention is to measure, in a simple manner, transverse forces and longitudinal forces acting on the tire during driving, with the above-mentioned advance work of inserting sensors in the tires and the problems involved in mounting the tires being avoided.

The object of the present invention is solved with method for contactlessly detecting the change in position of a measuring point (11) on or in a tire (1) on the basis of a force (7) by means of a sensor (9) acting on the tire (3) of a wheel especially during driving, with the sensor (9) being in a fixed stationary position in relation to the rim (2) of the wheel, wherein a source of radiation is present and by means of the sensor the change in position of the measuring point (11) in the longitudinal and/or transverse direction (y,x) in relation to the running surface of the tire is detected.

Hence, the invention in principle consists of measuring, by means of a sensor arranged on the rim, the change in position of at least one measuring point on the tire in a longitudinal direction and, in particular, also in a transverse direction in relation to the running surface of the tire, thereby determining the forces.

This gives rise to numerous advantages. In principle, it is now possible to contactlessly measure forces in the tire contact area. Since the sensor (or sensors) are not embedded in the tires, the sensor is not lost when the tire is changed. Due to the contactless detection of the change in position of the measuring point, it becomes much easier to mount the tires since there are no connecting cables between the tire and rim. Moreover, the sensor is extensively protected against being damaged by particularly serious tire deformations (driving over edge of sidewalk, flat tire). In addition, the fact that the sensors are not arranged in the running surface of the tire should have a positive effect on the performance of the tire and its load-carrying ability.

SUMMARY OF THE INVENTION

In order to mount the sensor in a particularly well protected manner, the present invention teaches fastening the sensor directly to the rim, whereby a particularly stable reference point is obtained. It is not necessary for the sensor to be in direct contact with the rim base. It can also be arranged on a toe connected to the rim, which protrudes radially outwards and, thus, exhibits a smaller distance to the inner surface of the tire. In this way, more precise measurements can be carried out under certain conditions, because the maximum shift angle as viewed from the sensor is increased significantly. Also, the sensitivity of the system can be increased by reducing the distance between the sensor and measuring point, since the contactless transmission distance for the radiation or electromagnetic fields being applied is shortened considerably.

The system of the present invention measures not only in a longitudinal direction (circumferential direction) and transverse direction of the running surface of the tire, but also (essentially) radially in relation to this. On the basis of the deflection of the running surface of the tire in the tire contact area that can be determined in this way, important parameters regarding vehicle dynamics such as, for example, tire pressure, load of the vehicle, strength of the running surface etc., can also be determined.

Basically, the measuring point can be located anywhere on the tire provided it is ensured that the sensor can detect changes in the position of the measuring point in the desired directions. Thus, for example, the measuring point may be arranged on the sidewall of the tire for measuring the circumferential direction. Moreover, it need not be on the surface of the inner surface of the tire, but can also be inserted in the tire, as long as the sensor can definitely measure changes in position.

If the measuring point is positioned on the inner surface of the tire, it can also be designed in a particularly simple manner as a passive transducer which reflects the radiation emitted by the sensor in a suitable way to the sensor. If transversal forces are to be measured, the measuring point should be located below the running surface of the tire, since this is where the greatest movements of the measuring point in a transverse direction occur.

The location information on the measuring point detected by the sensor are particularly accurate when the sensor operates at the same angle-of-rotation position as that of the measuring point of the wheel, so that such disturbance variables as, for example, torsion in both directions due to the tire contact area, vibration knot in the tire, imbalances etc. can be eliminated by forming the difference of the measured values. The angle-of-rotation position can be determined with sufficient accuracy by means of so-called maximum formation. For this purpose, for example using only one single measuring point, the transverse displacement in the x direction and/or the change in distance in the z direction (deflection) is measured at constant time intervals, which, given constant rotational speeds, correspond to equal angle-of-rotation distances.

If the measuring point passes through the tire contact area, a comparably large change in the z and x directions will be detected, and this can be used for determining the maximum displacements and, hence, the angle-of-rotation position of the wheel. It is not necessary for the location coordinates of only one single measuring point to be detected always during one certain angle-of-rotation position only in order to determine the active forces. Rather the same measuring point (or also several measuring points) can be measured one after the other by one single or several sensors in different angle positions. This, for example, may be important if the deflection of the tire contact area is to be related to the distance of the measuring point without deflection or if the transverse displacement of the measuring point in the tire contact area is to be related to the normal position of the measuring point outside the tire contact area. Using only one single measuring point should result in sufficiently accurate measuring results at high speeds (e.g. >50 km/h). When measuring lower driving speeds and, hence, rotational speeds of the wheel, it is recommended that several sensors be arranged along the circumference of a rim. In this way, several measurements can be taken in the tire contact area during one rotation of the wheel, through which the measuring points of the individual sensors pass.

The measurement is particularly simple when the measuring point is designed as an active, e.g. radiating, transducer. For this purpose, it could be, for example, an optical or acoustic magnetic or electromagnetic radiation or fields. Also a capacitive measurement can be recommended, provided it is ensured that the sensor can detect changes in position in the desired directions. However, an optical source of radiation is preferable, irrespective of whether the radiator is arranged on the sensor or in the measuring point. If the measuring point is a directed optical source of radiation (radiating or reflecting), then the incidence of the directed radiation on a field of optical probes belonging to the sensor may be a possibility of detecting the movement of the measuring point longitudinally and/or transversely to the tire surface. The sensor on the rim may have a matrix of radiation-sensitive probes, which are addressed differently, depending on the position of the measuring point. A measuring point taking the form of an active transducer (piezoelectric element, force transducer), however, can measure directly the force in a certain direction or several forces in different directions and contactlessly transmit these in coded form to the sensor. On the basis of appropriately formed apertures on the sensor, which allow varying quantities of radiation to pass through to the receiver of the sensor depending on the location of the transmitting beam, the change in the position of the measuring point also can be determined.

If the design on the side facing towards the tire is to be kept simple, it is preferable that the measuring point be of a passive design, and the radiation coming from the measuring point is a (reflecting) share of the radiation emitted from the sensor. In this kind of configuration, for example, the location or intensity of the reflected optical beam can be changed by displacing the measuring point in a longitudinal or transverse direction in relation to the running surface. For this purpose, the measuring point can be designed as a reflective surface, with the reflected beam changing its intensity or angle position (as related to the reflective surface) when the reflective surface is displaced sideways because of the curved inner surface of the tire, so that the change of the point of incidence on the sensor can be considered a measure of the displacement of the measuring point in the directions viewed. Yet, the active beam of the sensor also can systematically scan a specified area on the inner side of the tire, comparable to the scanning of a picture tube, and when it falls on the measuring point, it can record the angle position of the scanning beam at that instant, thereby determining the position of the measuring point. Another possibility would be to save the direction of movement of the measuring point and to have the beam retrace the movement of the measuring point in this way.

The change in location of the measuring point allows only indirect conclusions about the forces acting on the tire. If a signal is to be generated that describes the state of the wheel or the vehicle regarding the driving dynamics, i.e. in particular with respect to the changes in movement and forces that occur, then an evaluation device is applied which generates the desired signals characterizing the vehicle state on the basis of the output signals of the sensor. The measuring device, formed primarily by the sensor and evaluation device, can be mounted in an altogether stationary manner, i.e. particularly on the rim proper, corresponding to the combination of features described in claim 9. However, the evaluation device also can be mounted in a stationary position in relation to the wheel axle, e.g. on the cross member. In this way, the sensor is the only element on the rim requiring advance work, because the evaluation device need not be replaced when the rim is changed. However, the evaluation device also can be mounted centrally on the chassis, so that it can handle the output signals of several sensors (e.g. on the four wheels) either simultaneously or subsequently. The output signals of the sensor, depending on the required output values, e.g. for controlling the vehicle dynamics, are processed differently so that the desired values are available at the output of the evaluation device.

A certain difficulty in transmitting the output signals of the sensor or the evaluation device may possibly be leading these signals out through the rim from inside the tire as well as fastening the sensor or evaluation device on the rim. However, since the valve needs a rim opening in any case and, at the same time, provides a connection between the environment of the wheel and the inside of the wheel, it is advantageous to connect the sensor and/or the evaluation device with the valve or at least to arrange the abovementioned assemblies near the valve. In this manner, the output signals can easily be supplied to the environment of the wheel via the valve. Another considerable advantage offered is that the location of the sensor or evaluation device in the area of the rim can be determined unequivocally. This makes it much easier to mount the tire on the rim in a suitable angular position. Mounting the tire at a correct angle in relation to the rim and, consequently, the measuring point in relation to the sensor can be improved by marking the tire to indicate the correct position of mounting in relation to the rim, with the valve bore on the rim being used as an assigned marking on the rim. The correct mounting position of the tire can be ensured also by means of recesses or protrusions on the rim and tire that are allocated to one another, so that the tire can only be mounted on the rim in the correct position.

The invention is particularly suitable for tubeless tires. It can, however, also be used for tubeless tires, with the inner tire surface being replaced by the inner wall of the tube.

DETAILED DESCRIPTION OF THE PREFERRED EMBODIMENTS

Figure 2:
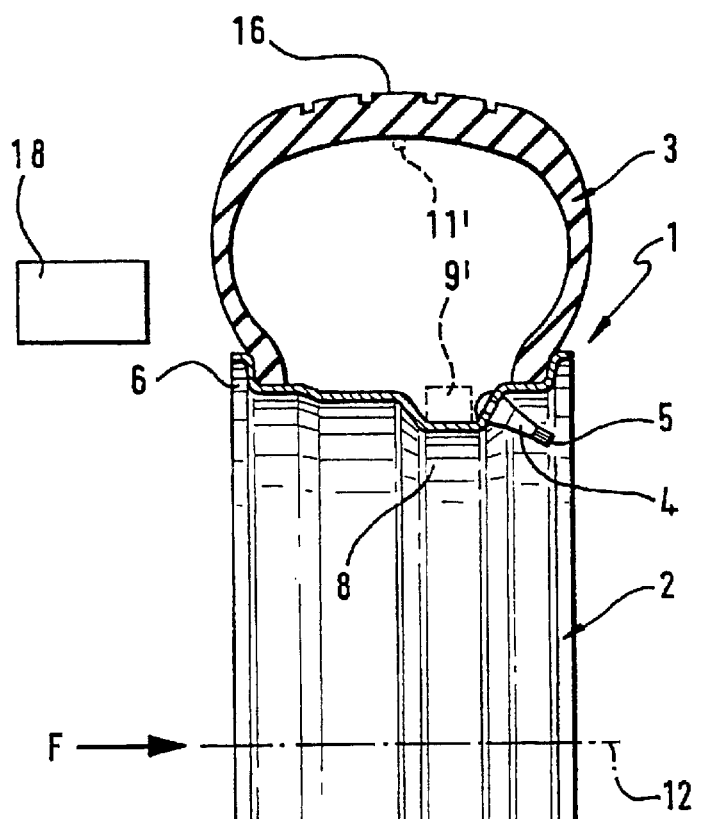
FIG. 2 shows an element of the tire contact area, in which the directions of the forces acting on the tire are indicated.
Figure 2:
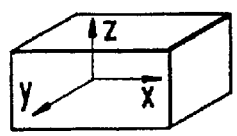
Figure 1:
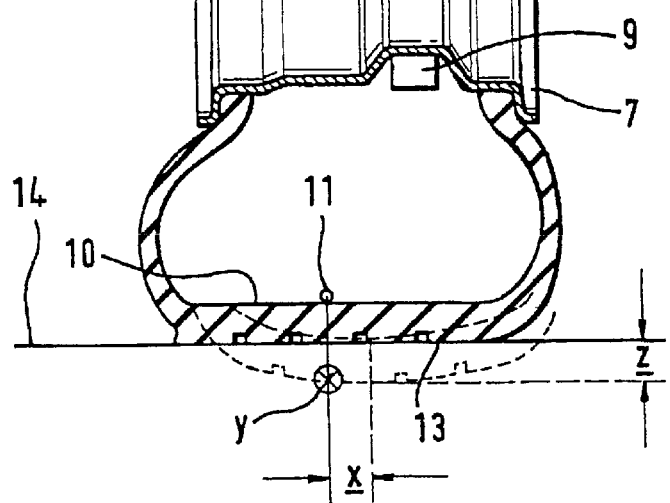
FIG. 1 is a sectional view of a wheel of a motor vehicle, where a tire is mounted on a rim.

FIG. 1 is a sectional view of a wheel 1 of a motor vehicle, where a tire 3 is mounted on a rim 2 without a tube. The tire is pumped up via a valve 4, which is locked with a valve cap 5. The valve preferably is arranged next to the sensor 9, but for reasons of clarity has been drawn opposite its preferred location (offset 180°). A sensor 9 is arranged between the valve horns 6,7 inside the rim on the rim base 8 preferably near the valve or combined with this in one piece. A measuring point 11 is arranged opposite the sensor, on the inner surface 10 of the tire 3. The wheel 1 rotates around an axle 12, with, for example, the measuring point 11 moving from the position shown at the bottom in FIG. 1 to the position 11 indicated by dotted lines in the upper half of FIG. 1. It goes without saying that the sensor, tire and valve rotate along with the rotation of the rim, so that the sensor also travels from the lower half of FIG. 1 to its position 9' indicated by dotted lines after a rotation of the wheel of 180°. As is known, the tire, due to the vertical force acting in the z direction (see FIG. 2), is compressed in the tire contact area by an amount z, as is shown at the bottom of FIG. 1. The size of the deflection depends on the pressure in the tire, type of tire and load. When the measuring point 11 leaves the position shown at the bottom of FIG. 1, the tire rebounds, assuming the position shown at the top of FIG. 1. When the distance between sensor 9 and measuring point 11 shown at the bottom and top of FIG. 1 are compared, i.e. the distance of half a wheel rotation, the deflection caused by the difference in travel allows conclusions on the pressure in the tire, load and other parameters.

During the rotation of the wheel 1, the measuring point travels not only in the z direction, but also in the x direction when lateral forces occur, as is illustrated by the comparison of the bottom and top of FIG. 1. If, for example, a force F acts laterally (e.g. via the wheel axle 12) on the rim 2, the tire is deflected in the x direction by the amount x in relation to the position of the sensor 9, as shown at the bottom of FIG. 1, always assuming that the tire contact area 13 adheres firmly to the surface 14 of the road. This displacement by the value x can be determined by the sensor and is a measure for the force acting laterally on the tire. In addition, due to the circumferential force acting on the tire during driving, the measuring point can be displaced vertically in relation to the viewer in the y direction (see FIG. 2), with this displacement being indicated at the bottom of FIG. 1 by the tip of an arrow pointing at the viewer. This displacement, too, can be determined on the basis of a comparison with a normal position of the measuring point 11, with no traction forces occurring in the y direction in this normal position. Whereas the displacement in the x direction essentially occurs when the tire 3 contacts the road surface 14 (this applies also to the maximum sinking in the z direction), the displacement in the y direction (torsion in relation to the axle 12) along the entire circumference of the wheel is essentially equal due to the large strength of the running surface 16 of the tire 3 as compared to the more elastic lateral surfaces, so that it is not absolutely necessary to measure the displacement y at the instant shown at the bottom of FIG. 1.

Now it is particularly important for the invention that the measurement of the change of position of the measuring point 11 output by the sensor 9 is obtained contactlessly, i.e. there are no mechanical connections between the sensor 9 and the measuring point 11. In order to achieve this configuration, the sensor 9 can be equipped with an optical transmitter, the radiation of which is reflected by the measuring point 11. The change in the beam reflected by the measuring point 11 is determined by suitable detectors on sensor 9 and is a measure of the displacement of the measuring point 11 in the x, y and z directions, and these detected displacements allow conclusions regarding the forces acting on the running surface. However, the measuring point 11 also can be equipped with an optical transmitter that radiates towards the sensor. Then the sensor can determine the change of position of the measuring point based on the changed state of the radiation detected by the sensor. In this respect, the sensor, for example, can be equipped with suitable optically sensitive cells, which are arranged in the form of a matrix, so that the change in position of the measuring point 11 can be determined at least in the x and y directions on the basis of the travel of the beam over the optically sensitive matrix. Another possibility is to have a beam emitted by the sensor 9 scan the inner surface of the tire 10 and, based on a special (e.g. reflective) marking of the measuring point, detect the position of the measuring point by means of a receiving reflection beam, thereby determining the displacement of the measuring point. In FIG. 1 an evaluation device 18 is indicated, which evaluates the displacement values detected by the sensor and calculates the desired parameters, which, for example, may relate to the forces acting on the tire, tire pressure, rotational speed of the tire as well as the speed of the measuring point or its acceleration. It also is possible to arrange the evaluation device 18 next to the sensor 9, also between the rim horns 6,7 on the rim inside the tire. The output signals of the sensor or evaluation device can then be injected contactlessly into a receiver arranged on the vehicle chassis in a known manner, with such receiver, for example, being connected to a controller that influences, on the basis of the output signals of the evaluation device, the forces acting on the tire by intervening in the engine or brake system. The sensor can also be combined in one piece with the valve 9 (not shown in FIG. 1), so that the position of the sensor on the rim is defined. Then the valve can be equipped with a pressure measuring device that is independent of the sensor 9, provided the output values of the sensor (z displacement of the measuring point 11) are not evaluated directly to determine the pressure.

What is claimed is:

1. Method of contactlessly detecting the change in position of a measuring point on or in a tire on the basis of a force acting on the tire, comprising the steps of:

rotating a sensor and a measuring point with the rotation of a tire rim arranging a source of radiation to irradiate from or to irradiate upon said measuring point, using the sensor to detect the irradiation irradiating from or upon said measuring point such that said sensor detects the change in position of the measuring point in a longitudinal or transverse direction in relation to a running surface of the tire.

2. Method according to claim 1, further including the step of mounting the sensor on the rim of the wheel.

3. Method according to claim 1, further including the step of using the sensor to detect the distance between the measuring point and the sensor or the change in position of the measuring point in the radial direction.

4. Method according to claim 1, further including the step of arranging said measuring point on an inner surface of the tire facing towards a rim of the tire proximate a the running surface of the tire.

5. Method according to claim 1, further including the step of using the sensor to cyclically detect the change in position of one or several measuring points on the tire simultaneously or cyclically, with the wheel always assuming the same angle-of-rotation position during the cyclically repeated detection of the change in position of a certain measuring point.

6. Method according to claim 1, further including the step of using the sensor to detect the change in position while the measuring point passes through the tire contact area.

7. Method according to claim 1, further including the step of using optical radiation whose state change is detected by sensor during driving.

8. Method according to claim 1, further including the step of using a marking on said measuring point that can be distinguished from its surroundings through the radiation of the sensor.

9. A measuring device for measuring the change in position of a measuring point on or in a tire on the basis of a force acting on the tire, comprising:
   a sensor attached to at least one of the tire, a wheel of the tire or, a valve of the tire, wherein said sensor rotates with said tire rim,
   a reference point associated with at least one of the tire, the tire wheel, or the tire valve, wherein said reference point rotates with said tire rim,
   a radiating source for irradiating said measuring point wherein said sensor senses the radiation irradiated upon said measuring point or radiation irradiated from said measuring point such that said sensor detects a change in position of the measuring point in a longitudinal or transverse direction in relation to a running surface of said tire.
   a reference point associate with at least one of the tire, the tire wheel, or the tire volve, wherein said reference point rotates with said tire rim,
   a radiating source for irradiating said measuring paint wherein said sensor senses the radiation irradiate upon said measuring point or radiation irradiated from said measuring point such that said sensor detects a change in position of the measuring point in a longitudinal or transverse direction in relation to a running surface of said tire.

10. Measuring device according to claim 9, wherein the sensor generates output signals which contain information on the longitudinal, transversal, and radial forces acting on the tire.

11. Measuring device with a sensor according to claim 10, wherein the output signals of the sensor contain tire pressure information.

12. Measuring device according to claim 9, wherein said sensor is connected to the tire valve.

* * * * *